April 17, 1928.

L. A. THOMPSON

MALTED MILK PRODUCT

Filed Feb. 15, 1926

1,666,633

Witness:
Erwin B. Ering

Inventor:
Livingston A. Thompson
By his Attorneys

Patented Apr. 17, 1928.

1,666,633

UNITED STATES PATENT OFFICE.

LIVINGSTON A. THOMPSON, OF WAUKESHA, WISCONSIN.

MALTED-MILK PRODUCT.

Application filed February 15, 1926. Serial No. 88,268.

This invention relates to a novel malted milk product and to the method of making such product.

This invention is in general an improvement over that disclosed in my copending application for malted milk products filed October 9, 1925, Serial Number 61,468.

Various attempts have been made to produce malted milk products which are intended to be eaten without any preparation whatsoever. These attempts, however, have not been successful as it has been found that when the malted milk is put up in tablet form that it becomes gummy when chewed and forms in relatively difficultly soluble balls. Further, it is obvious that the usual malted milk powder is unsuited for this purpose.

This invention is designed to overcome the defects noted above, and to provide a novel malted milk product which may be sold in its finished form ready for immediate consumption by the purchaser, and which is so made that it is porous and flavored throughout its body, and which will permit the saliva to percolate through the internal pores of the product which may be in the form of nuggets, for instance, and which will insure the ready and complete solution of the product without any possible chance of its forming into gummy and relatively difficultly soluble balls.

Further, it is apparent that this product could be used for making malted milk drinks without requiring the use of mechanical agitators, and in general, this invention has the same general objects as that disclosed in my prior application noted above.

Further objects are to provide a novel method of producing edible malted milk products, and to provide a step, or steps in the process, whereby the particular flavoring desired may be incorporated into the body of the product.

Embodiments of the invention are shown in the accompanying drawings, in which:—

In practicing this invention the malted milk stock while in liquid form, has added to it a small amount of gum arabic or gum tragacanth which is thoroughly mixed with the stock so that the stock is homogeneous. It is then delivered to the vacuum pan in the usual manner and dried in the form of cakes.

Figure 1:
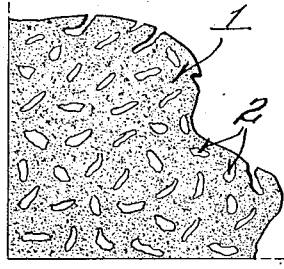
Figure 1 shows a fragment of the malted milk cake as it appears when removed from the vacuum pan.
Figure 2:
Figure 2 shows the cake as it appears when broken into chunks or nuggets.
Figure 3:
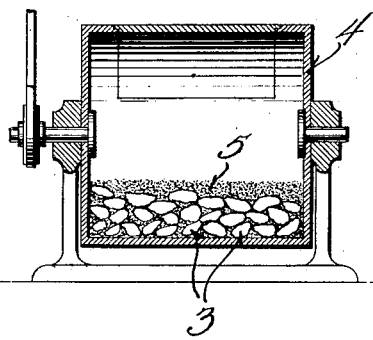
Figure 3 shows a step in the process of flavoring the malted milk product.
Figure 4:
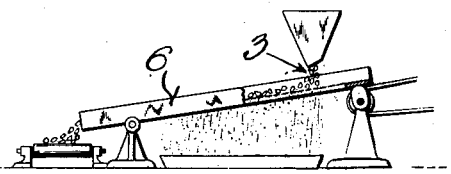
Figure 4 shows a further step in this method of flavoring the product.

In Figure 1, a fragment of one of these cakes is illustrated, and it will be seen that the cake 1 is provided with a plurality of pores or openings 2 which run in a haphazard and multitudinous manner through its body, and open outwardly through the exterior in numerous places. Thereafter, this cake is broken into nuggets or chunks 3 which, of course, contain the pores or apertures 2. Thereafter, these nuggets are placed in a tumbler or other machine of this type, such tumbler being illustrated in Figure 3, and indicated by the reference character 4. The flavoring is also put into the tumbler in the form of a dry powder, as indicated at 5, along with the nuggets 3. The material 5 may have any desired flavor. For example, the flavor, such as raspberry, maple or others of this type may be added to powdered sugar and this dry powder is, thereafter placed in the tumbler. The tumbler is run a sufficient length of time to cause the flavored powder to percolate into the pores of the nuggets and to coat not only the outside of the nuggets, but the inside of the pores as well. Thereafter, the chunks or nuggets are removed from the tumbler and are passed down a suitably agitated screen 6 in order to shake the excess powder therefrom, such nuggets being finally delivered from the machine in any suitable manner.

It will be seen that a novel malted milk product has been provided which is highly porous and is readily soluble, so that it may be freely eaten without the formation of gummy or insoluble balls.

Further, it will be seen that the malted milk product is flavored throughout its body portion in a novel manner without in any manner detracting from its solubility.

Further, it will be seen that a novel method of producing malted milk products has been evolved and that this method may be carried out with the greatest ease without requiring elaborate or complicated machines.

As pointed out in my prior application, it has been found that neither of the gums destroy the moisture absorbing characteristics of these nuggets, and that they do not interfere with the pleasing taste thereof. In fact, the amount of gum used is extremely small and need not exceed 2%.

Further, it has been found that the friable characteristics of the malted milk are wholly eliminated by the addition of either of the gums, and that they may be transported and handled without powdering.

Although the invention has been described in considerable detail, such description is intended as illustrative rather than limiting as the invention may be variously embodied and as the scope of such invention is to be determined as claimed.

I claim:

1. A malted milk product consisting of a dried mixture of malted milk stock and a soluble binder forming nuggets, said nuggets having a multitude of small apertures therethrough, and a flavoring layer coating the outside of the nuggets and the inside of the pores thereof.

2. The process of forming flavored malted milk nuggets consisting of adding to malted milk stock a small amount of a readily soluble binder, drying the stock in a vacuum pan, whereby a crisp porous cake is formed, breaking the dried cake into nuggets and causing an intimate contact between the nuggets and a fine flavored powder, whereby the powder will coat the outside of the nuggets and will permeate and coat the pores thereof.

In testimony that I claim the foregoing I have hereunto set my hand at Waukesha, in the county of Waukesha and State of Wisconsin.

LIVINGSTON A. THOMPSON.